July 12, 1932.   J. ZIMMER   1,866,960
BREAD SLICING MACHINE
Filed Jan. 17, 1931   2 Sheets-Sheet 2
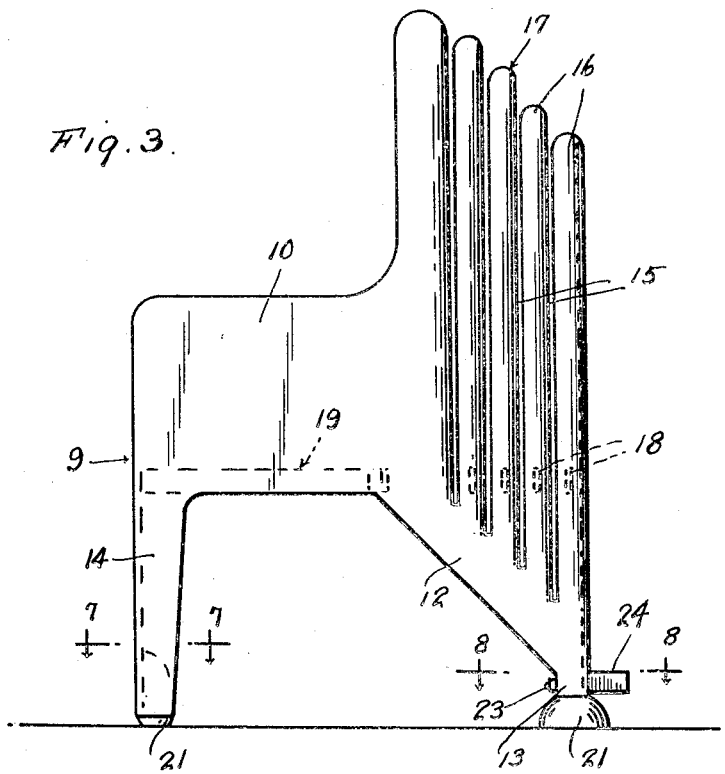
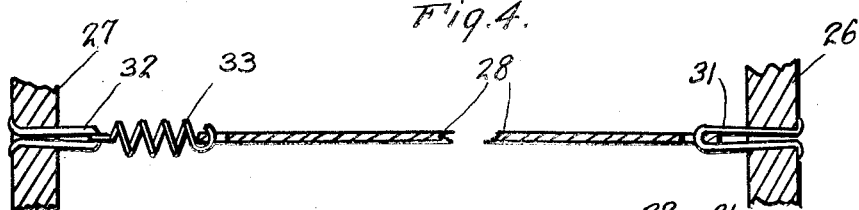
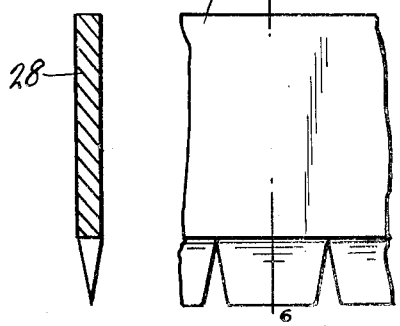
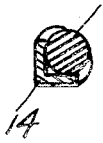
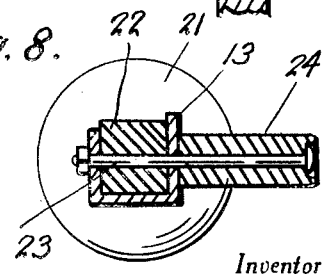
Inventor
Jacob Zimmer
By *Clarence A. O'Brien*
Attorney Patented July 12, 1932

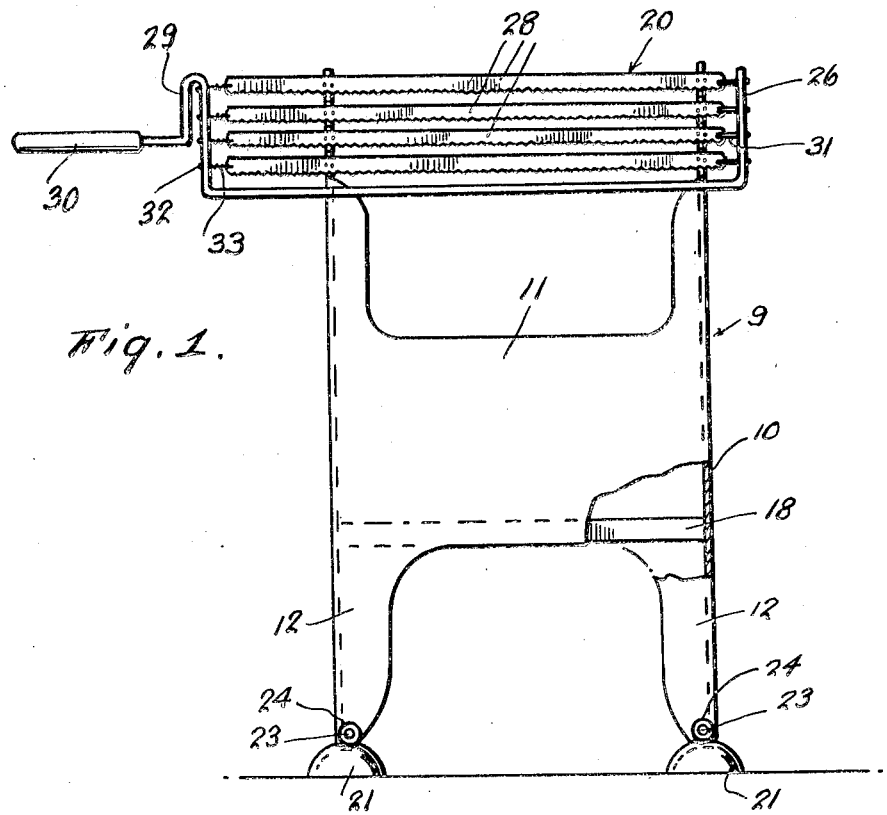
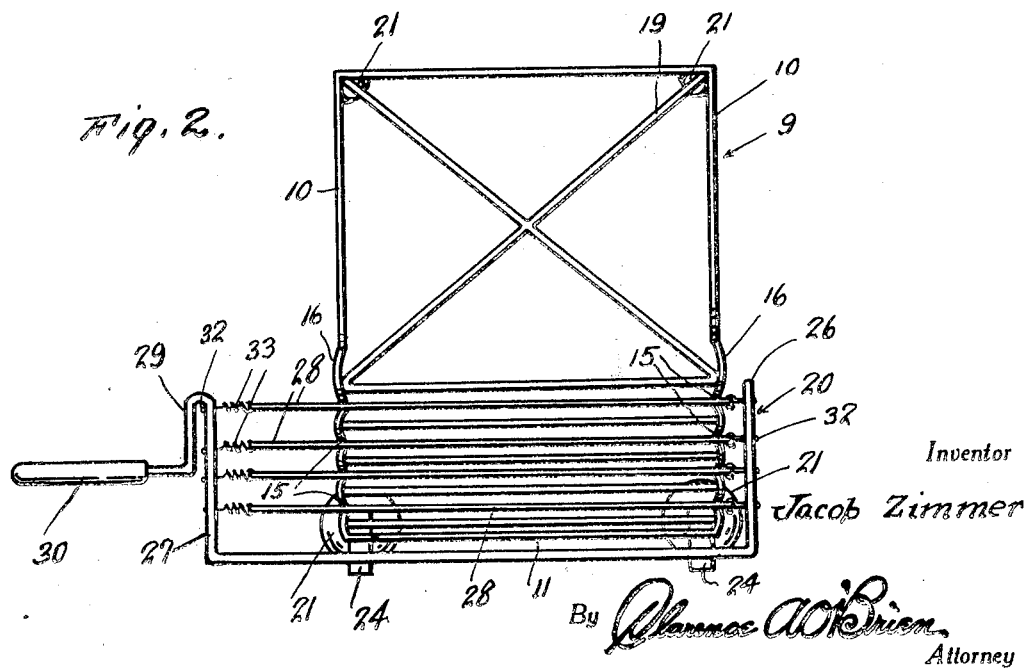

1,866,960

UNITED STATES PATENT OFFICE

JACOB ZIMMER, OF APPLETON, WISCONSIN

BREAD SLICING MACHINE

Application filed January 17, 1931. Serial No. 509,487.

This invention relates to a miniature bread slicing machine primarily designed for slicing a loaf of bread, and it has more particular reference to a device which is expressly designed for home use as well as for use in restaurants, lunchrooms, and the like.

Briefly stated, the improved structure is characterized by a suitable frame having its bottom constructed to provide an openwork rest for the loaf of bread and having its side walls constructed with a multiplicity of guides. A cutter used in conjunction with this frame is characterized by an appropriate manually operable carrier provided with a plurality of cutting blades, said blades being arranged for co-operation with the guides in such a manner as to permit successive severing of the slices of bread in uniform thickness.

In carrying the inventive conception into actual practice, I have provided the complete structure with appropriately designed accessories so as to produce a device which is simple, economical and efficient in operation, and susceptible of fulfilling the requirements of an invention of this class in a highly satisfactory manner.

Other features and advantages will become more readily apparent from the following description and drawings. In the drawings:

Figure 1 is a front elevational view of a bread slicing machine constructed in accordance with the present invention.

Figure 2 is a top plan view thereof.

Figure 3 is a side elevational view of the frame with the cutter removed.

Figure 4 is a fragmentary sectional view through the yoke of the cutter showing the specific mounting for the saw-like blade.

Figure 5 is a fragmentary elevation of the blade.

Figure 6 is a detail section on the line 6—6 of Figure 5.

Figures 7 and 8 are horizontal sections on the lines 7—7 and 8—8 respectively of Figure 3.

Referring to the drawings in detail, it will be observed that the numeral 9 designates generally the holder or frame. This is constructed of appropriate material and is preferably of the configuration and design illustrated in Figures 1 and 3. It includes spaced parallel side walls 10 and a web or front connecting wall 11. The forward portions of the side walls as indicated at 12 are directed downwardly and merge into front supporting feet or legs 13. These legs are channel-shaped in cross section as shown in Figure 8.

The rear end portion of the frame is provided with substantially L-shaped supporting legs 14. The side walls have their forward portions formed with vertical longitudinally spaced slits 15 defining a plurality of guide fingers 16. These fingers are channel-shaped in cross section to secure rigidity and the upper ends are rounded as indicated at 17 to facilitate application and removal of the cutting blade.

The numerals 18 designate horizontal spaced parallel bars forming a rest for the loaf of bread (not shown). The numeral 19 as shown in Figure 2 designates an openwork grid which co-operates with the supporting bars 18 to provide a convenient support for the loaf of bread. Incidently, the loaf of bread is inserted at the open back or rear of the frame and pushed against the front wall 11 which constitutes a stop. In a sense, this frame provides a convenient rack or holder for the loaf of bread while being cut into slices by the improved manually adjustable or regulated cutting device generally denoted by the numeral 20.

Mounted in the lower ends of the legs 14 are rubber cushioning feet 21. Similar rubber cushions are provided for attachment to the front legs 13. Each attachment comprises a circular base 21 having a rectangular shank 22 confined between the flanges of the legs 13 and held in place by a retaining bolt 23. This same bolt constitutes a mounting for rubber sleeves 24 which function as bumpers or stops to limit the downward stroke of the cutter. These project outwardly or forwardly from the legs 14 as is obvious.

The cutter 20 comprises a substantially U-shaped yoke 25 having its arm portions 26 and 27 fashioned for convenient mounting of the cutting blade 28. Incidently the arm 27 is provided with a return bend 29 forming a mounting for the handgrip 30. Each blade 28 as shown in Figure 4 is provided with saw teeth and one end is secured by a clip 31 to the arm 26. The opposite end is secured by a clip 32 to the opposite arm 27 through the medium of a coiled spring 33. This mounting permits detachment of the blade and oscillatory adjustment to provide for appropriate angular disposition to facilitate severing of the bread.

By placing the blade of the saw-like cutter in the guide 15 and racking the loaf of bread in the holder with one end of the loaf against the front wall 11, it will be seen that by moving the cutter downwardly and reciprocating it back and forth, the bread can be easily sliced. Due to the graduated formation of the guide and the successive positioning of the cutting blade, it is obvious that the blade cuts through the loaf in a progressive manner. In other words, the foremost or outermost blade cuts through first, the next blade second, and so on. A sufficient number of blades may be provided for cutting the entire loaf into slices.

The gist of the invention is in the provision of a loaf holder, preferably in the form of a rack so designed as to facilitate application and removal of the intact loaf as well as the slices after the loaf is cut. The holder is preferably provided with a graduated guide and cushioned supporting legs, as well as an open-work grid-like bottom to provide for easy escapement of the crumbs and cuttings. The cutter is essentially of the multiple knife or blade form for simultaneously and successively slicing the bread. The cutter is bodily removable and the blades are adjustably and removably mounted in the yoke so as to permit the yoke to be arranged for either left or right hand cutting operation.

It is thought that the description, taken in connection with the drawings, will enable a clear understanding of the invention to be had. Therefore, a more lengthy description is thought unnecessary.

While the preferred embodiment of the invention has been shown and described, it is to be understood that minor changes in shape, size, material, and rearrangement of parts may be resorted to in actual practice if desired.

I claim:

As a new product of manufacture, a bread holder comprising a frame including spaced parallel side walls, supporting feet, and a front stop wall, together with an openwork bottom, the frontal portions of said side walls being provided with longitudinally spaced vertically extending slits defining a multiplicity of guide fingers, said guide fingers being graduated in length, having their upper ends rounded to facilitate application and removal of cutting means, and being transversely bowed in cross section to secure rigidity of structure, and cushioning feet for said rack, together with forwardly projecting cushioned bumpers carried by the forward portion of the frame and located adjacent the supporting surface for co-operation with a part of the cutter to limit the downward stroke of said cutter.

In testimony whereof I affix my signature.

JACOB ZIMMER.